106. COMPOSITIONS,
COATING OR PLASTIC
90

Patented Dec. 5, 1944

2,364,555

UNITED STATES PATENT OFFICE 2,364,555

CEMENT COMPOSITION AND METHOD OF MAKING SAME

Edward W. Scripture, Jr., Shaker Heights, Ohio

No Drawing. Application July 17, 1942,
Serial No. 451,321

14 Claims. (Cl. 106—90)

This invention relates to a cement composition, a composition for grinding cement, and particularly to a method of grinding cement wherein the rate of grinding may be increased with existing equipment.

Hydraulic cements are manufactured by mixing together in a finely divided state, in suitable proportions, either by a wet process or a dry process, suitable raw materials, usually of a calcareous and a silicious nature, to produce after the manufacturing operation chemical compounds having hydraulic and cementitious properties in the desired proportions. The mixed raw materials are heated together in a kiln, in modern practice usually a rotary kiln, and burned at a temperature which causes sintering, or in some cases they may be burned to actual fusion. After burning the resultant product, usually called "clinker," is allowed to cool. In this state of manufacture the cementitious compounds have been formed but exist in a physical state, that of relatively large pieces with very low surface area, in which they cannot be used to make mortar or concrete mixes. This cement clinker is then reduced by grinding, usually in a ball mill of either the intermittent or continuous type, to a relatively fine state of subdivision having a relatively large surface area. During this stage, calcium sulfate in one form or another is usually added to the cement to prevent too rapid set.

The hydraulic properties of the cement depend on its chemical composition and on the burning operation, but also to a considerable extent on the grinding and the degree of fineness to which it has been reduced. For example, the plastic properties and the rate at which the cement hydrates are markedly affected by the surface area, i. e., the degree of grinding.

The grinding of cement clinker requires the use of considerable equipment and consumes a substantial period of time. In order to operate the equipment, power in one form or another is required. The grinding operation, therefore, adds substantially to the cost of manufacture of cement and it will be obvious that the finer the grinding the greater will be this cost.

It has heretofore been known that certain materials when added to cement clinker in the mill will facilitate grinding and will increase the efficiency of this operation. In order to be useful, such materials must not have an adverse effect on the plastic or hydraulic properties of the cement, as by retarding or preventing hydration. It is preferable that such materials, which may be termed "grinding aids," shall improve the properties of the cement and of the mortar or concrete in which they are used with respect to strength, rate of hardening, plasticity, durability, or other properties.

It is an object of this invention to provide a method of producing finely ground cement, wherein the cost of grinding the cement clinker is reduced.

It is another object of this invention to provide a method for grinding cements, wherein the time required to reduce cement clinker to a given surface area is reduced.

It is another object of this invention to provide a method wherein the finer grinding of cement clinker and the production of a cement of greater surface area are facilitated.

It is another object of this invention to provide a ground cement clinker which shall have improved plastic and hydraulic properties.

It is a further object of the present invention to provide an indurating composition for cement.

It is a still further object of the present invention to provide an indurating composition which will improve the properties of concrete, mortar and the like made from hydraulic cement mixes containing pozzolanic materials, accelerating agents, dispersing agents, etc. in suitable amounts.

Some grinding aids heretofore proposed are hygroscopic and when incorporated in the cement in amounts proposed adversely affect the keeping or storing properties of the cement by absorbing moisture from the atmosphere. It is, therefore, another object of the present invention to provide a method for grinding cement wherein the cost of grinding is reduced and whereby the storing or keeping qualities of the cement produced are not impaired.

In my prior application Serial No. 406,904, filed August 14, 1941, and Patent 2,264,336, issued December 2, 1941, I disclosed that certain aromatic compounds, including the substituted benzoic acids, improve a concrete or cement mix when incorporated therein, and when incorporated with cement clinker reduce the grinding time and power required to obtain a cement with a given surface area.

It has now been found that the above objects are also accomplished by incorporating in the cement, and preferably by incorporating with the cement clinker in the grinding mill a relatively small percentage, based on the weight of the cement, of a saturated aliphatic compound, consisting of a carbon-to-carbon chain of at least four carbon atoms and preferably less than twelve carbon atoms. The saturated aliphatic compound has attached to one or more carbon atoms, besides hydrogen, at least one and preferably two hydroxyl groups and at least one additional solubilizing group selected from the group consisting of sulfate, sulfonic acid, sulfonate, halogen, nitro, nitroso and hydroxyl groups. The chain of carbon atoms may be straight or branched, as desired, and preferably should not substantially exceed twelve carbon atoms.

The compounds I have found to be effective have the general formula $$R\begin{matrix} \diagup X \\ \diagdown OH \end{matrix}$$

where R is a member of the group consisting of alkylene groups having four or more carbon atoms and such alkylene groups having one or more hydrogens substituted by a member of the group consisting of sulfate, sulfonic acid, sulfonate, halogen, nitro, nitroso and hydroxyl groups, and X is a member of the group consisting of sulfate, sulfonic acid, sulfonate, halogen, nitro, nitroso and hydroxyl groups. The general formula may also, if desired, be written as R''—OH, where R'' is a carbon-to-carbon chain of at least four carbon atoms, containing besides hydrogen at least one group selected from a member of the group consisting of sulfate, sulfonic acid, sulfonate, halogen nitro, nitroso and hydroxyl groups.

The alkylene groups may have straight or branched chains of the general formula $$-C_mH_{2m}-$$

where $m$ is at least four and preferably less than twelve. Examples of such groups are:

CH₃—CH₂—CH—CH₂—
              |

—CH₂—CH₂—CH₂—CH₂—

—CH₂—CH₂—CH₂—CH₂—CH₂—

—CH₂—CH—CH₂—
       |
       CH₃

CH₃—C—CH₂—CH—CH₃
      |          |
      CH₃ etc. In a substituted alkylene group, one or even more of the hydrogen atoms is substituted by a member of the group consisting of sulfate, sulfonic acid, sulfonate, halogen, nitro, nitroso and hydroxyl groups. Preferably, the substituents in the carbon-to-carbon or hydrocarbon chains are separated by carbon atoms having no substituent.

In the more desirable compounds there is at least one of the solubilizing substituents for each five or six carbon atoms.

The hygroscopic properties of the compound depend largely on the number of hydroxyl groups and upon the length of the carbon-to-carbon chain, increasing when the number of hydroxyl groups increases and decreasing when the number of carbon atoms increases. A branched chain compound appears to be less hygroscopic than a straight chain compound of the same length; a branched chain compound also appears more soluble than a straight chain compound of the same number of carbon atoms, hence branched chain compounds are usually preferred. In any case, a chain of at least four carbon atoms is desirable to reduce the hygroscopic properties of the compound, particularly where more than one hydroxyl group is present.

Compounds to which the present application is particularly directed contain alkylene groups or a carbon-to-carbon chain of at least four carbon atoms with at least two hydroxyls. Some of the most desirable compounds have the general formula $$R'\begin{matrix} \diagup OH \\ \diagdown OH \end{matrix}$$

where R' is an alkylene group of at least four carbon atoms. Hydroxyl groups may be linked to adjacent carbons, but it is preferred that carbon atoms to which hydroxyl groups are attached be separated by at least one carbon atom. While hydroxyl groups may be attached to terminal carbon atoms it is preferable in the case where only two such groups are present that at least one hydroxyl be attached to an intermediate carbon atom.

It has been observed that in the grinding of cement clinker the balls, in a ball mill, and the walls of the mill tend to become coated with the more or less finely ground cement. This formation on the grinding surfaces apparently exerts a cushioning effect, such that the rate of grinding is thereby greatly diminished.

Although I do not offer this explanation as a necessary explanation of the results of the present invention, I have found that when small amounts of these chemical compounds are added to cement clinker in a ball mill, the formation of a cushion on the grinding surfaces appears to be reduced and the efficiency of the grinding operation is increased. In this manner the time required, and consequently the power input, to grind to a particular degree of fineness or surface area is reduced, or for a given time and power input the degree of fineness or surface area is increased.

It may be that the reason these compounds having the two solubilizing groups offer advantages over compounds having a single solubilizing group is that these two lyophilic groups are adsorbed on the surfaces of the cement particles. By the adsorption of two groups placed at different points in the molecule the molecule itself would be expected to assume a more or less horizontal position with relation to the cement particles, rather than a more or less vertical position, as might be expected if only a single group were adsorbed. In order to prevent folding of a compound having four or more carbon atoms, it is preferable when only two solubilizing or polar groups are present that at least one such group be attached to carbon atoms intermediate or between the terminal carbon atoms. For the same reason, it is also desirable that the carbon atoms containing solubilizing or polar groups be separated by one or more carbon atoms. In this manner a given amount of the reagent would cover a larger surface area of a cement particle, i. e., a smaller amount would be required to produce a given effect.

The preferred number of solubilizing substituents depends largely on the length of the chain and upon the number of carbon atoms in the compound, increasing when the number of carbon atoms or the chain length are increased.

It would appear very desirable that the amount of a grinding aid added to the cement clinker should be as small as is consistent with effective results. Possibly this amount is the amount required to form an adsorbed layer one molecule thick. If a layer of considerable thickness is built up on the cement particles, it would be expected that this layer would interfere with the subsequent reactions of the cement. With an hygroscopic substance a relatively thick layer on the cement particles would tend to take up a large amount of water, and thus impair the keeping qualities of the cement, and which would become partially hydrated during storage. With a very small amount of hygroscopic compound this effect would not be appreciably injurious.

Where the compound used as grinding aid is held to the cement particles in a more or less horizontal position, rather than in a vertical or folded position, the thickness of the layer required will be markedly less. It may be surmised that, beyond a complete coverage of the surfaces of the cement particles, further improvement in grinding qualities will be negligible.

The following compounds are examples of those included by the above general formula and found to be effective in accomplishing the objects of the present invention:

2 methyl 2,4 pentanediol;
2 nitro 2 methyl 1,3 propanediol;
2 nitro 2 ethyl 1,3 propanediol;
1,3 butanediol;
2 nitro 1 butanol;
2 nitro 2 methyl 1 propanol;
Tris (hydroxymethyl) nitromethane.

The saving in grinding time depends to a large extent both on the quantity of the above described compounds, which are present in the cement, and on the degree of fineness desired in the cement. With an increase in quantity of the above described compounds added to the mill from effective amounts, such as about .005%, based on the weight of the cement, up to about .05% or .1%, an increase in the efficiency in grinding time may be had. Although as much as .3% to .5% of the above compounds may be incorporated with the cement clinker, appreciable further improvement in results is not obtained and unless the proportion of hydroxyl groups to carbon atoms is less than one-half, the hydroscopicity may be troublesome even though four or more carbon atoms are present in the compound. It is generally preferable to use less than .05%, such as .045%, of the addition as most of the benefits are obtained with a saving in cost. When the cement is ground to a greater surface area, the saving in the grinding time over processes of the prior art is substantially increased.

Compounds such as 2 methyl 2,4 pentanediol are particularly desirable grinding aids. These compounds appear to be less hygroscopic than compounds having the hydroxyl groups attached to terminal carbons, and, unlike such compounds, their hygroscopic tendencies do not change with temperature, i. e., they have low temperature coefficients of hygroscopicity over a rather wide range of temperature as in the grinding of Portland cement quite high temperatures develop in the mill. A cement passes through a number of temperature ranges, so it is desirable that a material used in this cement should not show marked variations in properties with temperature changes. The proportion of these compounds incorporated in the cement may, therefore, be larger than the proportions of compounds having higher hygroscopicity without affecting the keeping qualities of the cement.

The following examples illustrate the effect of the compounds of the above general formula in reducing the grinding time or in increasing the surface area of the cement:

Example 1

A weighed amount of cement clinker was incorporated in a mill. .05% of 2 methyl 2,4 pentanediol was added to the cement clinker and the mixture ground for two hours. Another batch of the same cement clinker was ground for two hours in the same mill. Both batches contained the customary additions of gypsum. The surface area of the ground cement prepared without the addition of the organic compound was then measured and compared with the surface area of the ground cement prepared with the addition of 2 methyl 2,4 pentanediol by means of a Klein turbidimeter. The surface area of the cement ground in the presence of the addition was 1850 sq. cm./gr., whereas the surface area of the cement ground without the addition was only 1545 sq. cm./gr.

When smaller proportions of 2 methyl 2,4 pentanediol were incorporated with the cement, although the surface area was substantially greater than that of cement ground without the addition, the increase in surface area was somewhat less than when .05% was present. When larger amounts were ground with the cement some further increases in surface area were secured, but when amounts such as .1% or more were used these increases were not so great.

Example 2

A given cement clinker was ground under identical conditions with the percentages of 2 methyl 2,4 pentanediol given in the following table:

| 2 methyl 2,4 pentanediol | Surface area |
| --- | --- |
| | Sq. cm./gr. |
| .000% | 1,600 |
| .005% | 1,690 |
| .015% | 1,730 |
| .045% | 1,930 |
| .060% | 1,995 |
| .075% | 1,990 |
| .100% | 1,920 |

It will be seen from the above that the amount of grinding aid used affects the efficiency of the grinding and that the efficiency increases with increasing amounts of 2 methyl 2,4 pentanediol, but that a substantial proportion of the increased grinding efficiency is secured with .045%. With further increased amounts above .07% or .08%, based on the weight of the cement, the surface area of the cement tends to decrease.

Example 3

A weighed amount of cement clinker was incorporated in a mill. .045% of 2 nitro 2 methyl 1,3 propanediol was added to the clinker and the mixture ground for two hours. Another batch of the same quantity of the same clinker was ground for two hours in the same mill without any addition. The surface area of the cement ground with the addition was 1855 sq. cm./gr. and the surface area ground without the addition was 1550 sq. cm./gr.

Example 4

A weighed amount of cement clinker was incorporated in a mill. .045% of 2 nitro 2 ethyl 1,3 propanediol was added to the clinker and the mixture ground for two hours. Another batch of the same cement clinker was ground for two hours in the same mill without any addition. The surface area of the cement ground with the addition was 1810 sq. cm./gr. and the surface area of the cement ground without the addition was 1515 sq. cm./gr.

In accordance with another aspect of the present invention, it has been found that compounds of the above general formula when present in relatively small proportions, above set forth, also exert a beneficial effect upon a hardened cement or concrete mix.

Example 5

This example illustrates the effect of the organic compounds containing the above designated grouping in improving the compressive strength of a concrete mix.

Test cylinders were made from two separate concrete mixes comprising identical amounts of cement, sand and aggregate. Both mixes contained 447 pounds cement, 1,340 pounds sand and 1,985 pounds of three-fourths inch stone. In one mix the cement of Example 1 ground with .05% of 2 methyl 2,4 pentanediol was used; in the other mix the cement ground without the organic addition was used. Water was added to both mixes to bring them to substantially equal consistency. In the mix containing the cement ground without the organic addition, eight gallons of water per sack of cement were required; in the case of the other mix, seven and one-fourth gallons water per sack of cement were required. Several test cylinders 6" x 12" were prepared from each mix, cured under identical conditions, and broken in a compression testing machine according to standard procedure at various ages. The results of these tests are as follows:

|  | Compressive strength, lbs./sq. in. | | | |
| --- | --- | --- | --- | --- |
|  | 1 day | 3 days | 7 days | 28 days |
| Cement ground without 2 methyl 2,4 pentanediol | 635 | 1,470 | 2,350 | 3,305 |
| Cement ground with 2 methyl 2,4 pentanediol | 1,130 | 2,400 | 3,235 | 4,300 |

Example 6

Cements ground as in Example 2 with varying percentages of 2 methyl 2,4 pentanediol were utilized in preparing separate concrete mixes comprising identical amounts of sand, cement and aggregate, as described in above Example 5. When 6" x 12" test cylinders prepared from each mix were cured under identical conditions, broken in a compression testing machine according to standard procedure, the compressive strengths indicated below were obtained:

| 2 methyl 2,4 pentanediol | Compressive strength, lbs./sq. in. | |
| --- | --- | --- |
|  | 1 day | 3 days |
| None | 635 | 1,470 |
| .045% | 1,130 | 2,400 |
| .075% | 900 | 2,300 |
| .100% | 955 | 2,280 |

It will be seen from the above that although cements with the largest proportions of 2 methyl 2,4 pentanediol have the same or even higher surface areas, they give lower compressive strengths at the early ages, and this is especially marked at one day. Since the objective sought in finer grinding of cement is the production of higher early strengths to secure high early strength cements, it will be seen that a proportion of 2 methyl 2,4 pentanediol in excess of a certain amount defeats the purpose for which it is used and is undesirable. I, therefore, prefer to use a proportion of this compound less than .05% of the weight of the cement, but a proportion up to .1% is obviously not injurious. The beneficial effects of this invention are not secured unless an appreciable amount of the compound, say .005% is used.

It will be seen that far from having a deleterious effect, the grinding of cement with 2 methyl 2,4 pentanediol has improved its properties.

Other aliphatic compounds having three or more carbon atoms and containing the above designated grouping, and particularly those compounds above enumerated, when substituted for the 2 methyl 2,4 pentanediol of the above examples also cause similar improvements.

It is preferred to incorporate the compounds included by the above designated general formula into the cement during the grinding operation. It has been found that when they were thus incorporated, greater improvement in the cement may be obtained. However, a substantial improvement in the cement or concrete mix may be had when the above compounds are added to the ground cement at later stages.

Cement dispersing agents, such as active ingredients of waste sulphite liquor, naphthalene sulfonic acids, wetting agents, such as lauryl sodium sulfate and other alkali metal sulfates or sulfonates, and accelerators, such as calcium chloride and other metal chlorides or electrolytes, for increasing the rate of hardening or setting of the cement, pozzolanic materials, etc., may, of course, also be incorporated in the cement mix, if desired. One or more of the above organic compounds may also be mixed with suitable amounts of an accelerator, such as calcium chloride, and/or cement dispersing and/or wetting agents. While calcium chloride or other hygroscopic compounds may be added to the cement at the time of use, it is not usually desirable to add such hydroscopic substances to the clinker before or during grinding, as the keeping qualities of the cement produced would be reduced. A particularly desirable mixture for addition to cement may contain the solid constituents of waste sulphite liquor or other cement dispersing agent, and calcium chloride, with the ingredients proportioned to give in a cement mix .005% to .1% on the weight of the cement of the aliphatic compound, .001% to .5% of the solid constituents of a cement dispersing agent such as waste sulphite liquor residue, and the usual amounts, such as up to 2%, of calcium chloride. If desired, the waste sulphite liquor may be substituted by other cement dispersing agents, or even wetting agents, such as lauryl sodium sulfate. Waste sulphite liquor or the dried residue thereof contains water-soluble, active ingredients which function to disperse cement particles in water. While the whole waste sulphite liquor, or the dried residue thereof, which is more conveniently handled, may be used, the cement dispersing components of the liquor or residue may be substituted, if desired. In referring to the solid constituents of waste sulphite liquor this expression is used to designate one or more of the active ingredients thereof, either dry or in water.

It will be apparent that a compound which facilitates grinding, such as 2 methyl 2,4 pentanediol, or a compound of similar constitution, may be added to the cement clinker in its natural physical form or in solution, or in any other physical form. It will also be apparent that more or less of the usual amount of gypsum or other form of calcium sulfate may be added, depending on the desired characteristics of the cement, and that other substances may be added to the cement at the same time, or subsequently.

Furthermore, it is to be understood that the particular form of product shown and described and the particular procedure set forth are presented for purposes of explanation and illustration, and that various modifications of said product and procedure can be made without departing from my invention as defined in the appended claims.

What I claim is:

1. In the process of grinding cement clinker, the step which comprises grinding the cement clinker in the presence of a small amount of an aliphatic compound consisting of a carbon-to-carbon chain having at least four carbon atoms and not substantially more than twelve carbon atoms, said compound consisting of carbon hydrogen, at least one hydroxyl group and one member of the group consisting of sulfate, sulfonic acid, sulfonate, halogen, nitro, nitroso and hydroxyl groups.

2. In the process of grinding cement clinker, the step which comprises grinding the clinker in the presence of from about .005% to about .1%, based on the weight of the cement, of an aliphatic compound consisting of a carbon-to-carbon chain having at least four carbon atoms and not substantially more than twelve carbon atoms, said compound consisting of carbon, hydrogen, at least one hydroxyl group, and one member of the group consisting of sulfate, sulfonic acid, sulfonate, halogen, nitro, nitroso and hydroxyl groups.

3. In the process of grinding cement clinker, the step which comprises grinding the clinker in the presence of from about .005% to about .1%, based on the weight of the cement, of an aliphatic compound of the general formula

where R is a hydrocarbon alkylene group of at least four and not substantially more than twelve carbon atoms.

4. In the process of grinding cement clinker, the step which comprises grinding the clinker in the presence of from about .005% to about .1%, based on the weight of the cement, of an aliphatic compound of the general formula R—OH, where R is a saturated carbon-to-carbon chain of four to about twelve carbon atoms, and consisting of carbon, hydrogen and one member of the group consisting of sulfate, sulfonic acid, sulfonate, halogen, nitro, nitroso and hydroxyl groups.

5. In the process of grinding cement clinker, the step which comprises grinding the clinker in the presence of from about .005% to about .1%, based on the weight of the cement, of an aliphatic compound of the general formula R—OH, where R is a saturated carbon-to-carbon chain of four to twelve carbon atoms, and having a nitro group substituted therein.

6. The process according to claim 1 wherein the compound used contains one hydroxyl group attached to an intermediate carbon atom.

7. The process according to claim 1 wherein the aliphatic compound is 2 methyl 2,4 pentanediol.

8. A dry cement comprising about .005% to about .1% of an aliphatic compound consisting of a carbon-to-carbon chain having at least four and not substantially more than twelve carbon atoms, hydrogen, at least one hydroxyl group and one member of the group consisting of sulfate, sulfonic acid, sulfonate, halogen, nitro, nitroso and hydroxyl groups.

9. A dry cement comprising a small amount of an aliphatic compound consisting of a carbon-to-carbon chain having at least four and not substantially more than twelve carbon atoms, said compound consisting of carbon, hydrogen, at least one hydroxyl group, and one member of the group consisting of sulfate, sulfonic acid, sulfonate, halogen, nitro, nitroso and hydroxyl groups.

10. A dry cement comprising a small amount of an aliphatic compound of the general formula

where R is a hydrocarbon alkylene group of four to twelve carbon atoms.

11. A dry cement containing a small amount of 2 methyl 2,4 pentanediol.

12. An indurating composition for addition to cement comprising the solid constituents of waste sulphite liquor and an aliphatic compound consisting of a carbon-to-carbon chain of four to twelve carbon atoms, hydrogen, at least one hydroxyl group and one member of the group consisting of sulfate, sulfonic acid, sulfonate, halogen, nitro, nitroso and hydroxyl, said aliphatic compound and said solid constituents of waste sulphite liquor being proportioned to give in the cement mix, based on the weight of the cement, .005% to about .1% of said aliphatic compound and .001% to .5% of said solid constituents of waste sulphite liquor.

13. An indurating composition for addition to cement comprising the solid constituents of waste sulphite liquor and an aliphatic compound consisting of a carbon-to-carbon chain of four to twelve carbon atoms, hydrogen, at least one hydroxyl group and one member of the group consisting of sulfate, sulfonic acid, sulfonate, halogen, nitro, nitroso and hydroxyl groups.

14. A concrete or mortar mix comprising sand, aggregate, an hydraulic cement and a small amount of an aliphatic compound consisting of a carbon-to-carbon chain having at least four and not substantially more than twelve carbon atoms, containing besides hydrogen substituent groups consisting of at least one hydroxyl group and one member of the group consisting of sulfate, sulfonic acid, sulfonate, halogen, nitro, nitroso and hydroxyl groups.

EDWARD W. SCRIPTURE, Jr.